United States Patent [19]
Epstein et al.

[11] Patent Number: 5,512,795
[45] Date of Patent: Apr. 30, 1996

[54] PIEZOELECTRIC ELECTRIC ENERGY GENERATOR

[75] Inventors: Michael Y. Epstein, Belle Mead; Charles B. Carroll, Trenton, both of N.J.

[73] Assignee: Ocean Power Technologies, Inc., W. Trenton, N.J.

[21] Appl. No.: 404,180

[22] Filed: Mar. 13, 1995

[51] Int. Cl.$^6$ .................................... H01L 41/113
[52] U.S. Cl. ............................................. 310/339
[58] Field of Search ................................ 310/338, 339

[56] References Cited

U.S. PATENT DOCUMENTS

| | | | |
|---|---|---|---|
| 3,101,420 | 8/1963 | Huffard et al. | 310/339 |
| 3,208,443 | 9/1965 | Hurwitz | 310/339 |
| 3,350,583 | 10/1967 | Schiavane | 310/339 |
| 3,539,841 | 11/1970 | Riff | 310/339 |
| 4,510,935 | 4/1985 | Spencer | 310/339 |
| 4,853,580 | 8/1989 | Sula | 310/339 |

FOREIGN PATENT DOCUMENTS

| | | | |
|---|---|---|---|
| 0699590 | 11/1979 | U.S.S.R. | 310/339 |

*Primary Examiner*—Thomas M. Dougherty
*Attorney, Agent, or Firm*—Michael Y. Epstein

[57] ABSTRACT

An electrical energy generator comprises a cylindrical stator, a cylindrical liner of a piezoelectric material in concentric contact with the stator, and an armature rotatable about the liner. In one embodiment, as the armature rotates, the armature squeezes successive portions of the liner against the stator for alternately compressing and decompressing the liner portions for causing them to generate electrical energy. In another embodiment, the armature causes alternating stretching and destretching of successive portions of the liner between spaced apart portions of the stator for causing the liner portions to generate electricity.

8 Claims, 5 Drawing Sheets

PIEZOELECTRIC ELECTRIC ENERGY GENERATOR

BACKGROUND OF THE INVENTION

This invention relates to a piezoelectric electric generator, and particularly to a generator for converting mechanical motion into electrical energy.

There are numerous instances where there is a need for electrical energy, but at such small power levels that conventional electric generators tend to be under utilized, hence relatively expensive. One example is a bicycle generator driven by contact of a roller with a side wall of one of the bicycle tires. The roller drives the armature of a conventional electric generator. Because of the expense, as well as the weight of the generator, bicycle electric generators are not extensively used.

Another example is an internal combustion engine running generally unattended at a remote location, e.g., on a farm and used to pump water into an irrigation channel or the like. A battery provides electrical energy for running the engine and for periodically starting it up. The battery is charged by a conventional generator or alternator driven by rotary motion transferred to the generator from the engine by conventional belts or the like.

Problems are that the belts tend to wear and break and, generally, the generators are quite under utilized, hence relatively expensive to provide and replace as well as consuming excessive amounts of power in comparison with the amount of electrical power actually required.

A need thus exists for an electrical generator usable in direct replacement of conventional electric generators, but less expensive, complicated and of small weight.

In addition to the foregoing, the present invention has utility for generating electrical energy from flowing fluids and from surface waves on bodies of water.

SUMMARY OF THE INVENTION

An electric generator comprises a stationary member, a piezoelectric member mounted for contact with the stationary member, and an armature moveable relative to the piezoelectric member for causing variable straining of the piezoelectric member relative to the stationary member.

In one embodiment, the armature alternately compresses and decompresses adjacently disposed portions of the piezoelectric member against the stationary member as the armature moves relative to the piezoelectric member.

In another embodiment, the armature alternately stretches and destretches adjacently disposed portions of the piezoelectric member relative to spaced apart portions of the stationary member as the armature moves relative to the piezoelectric element.

DESCRIPTION OF THE DRAWING

The drawings are schematic and not to scale.

DESCRIPTION OF PREFERRED EMBODIMENTS OF THE INVENTION

Figure 1:
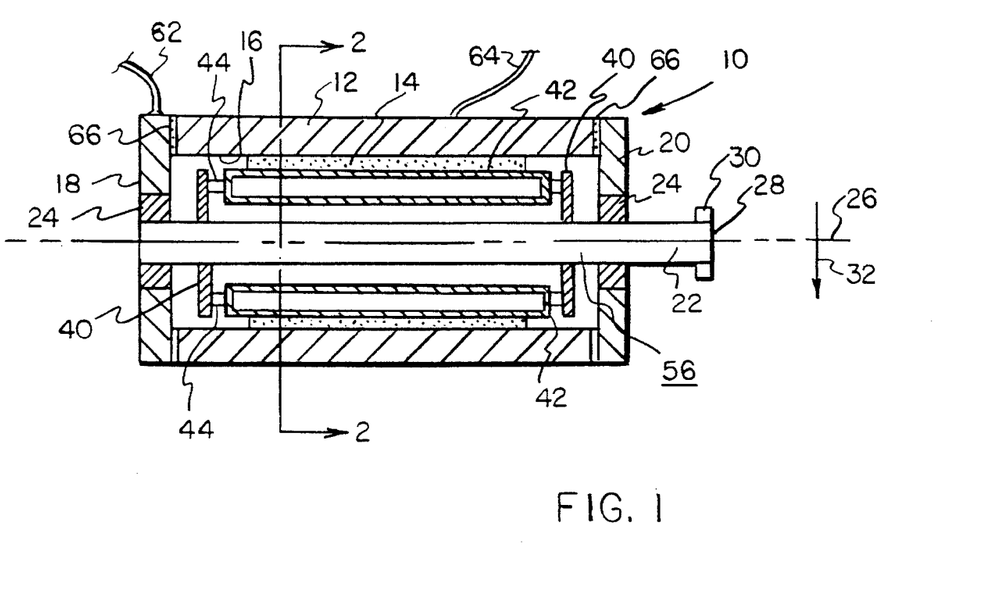
FIG. 1 is a side section of a piezoelectric generator according to the invention.
Figure 2:
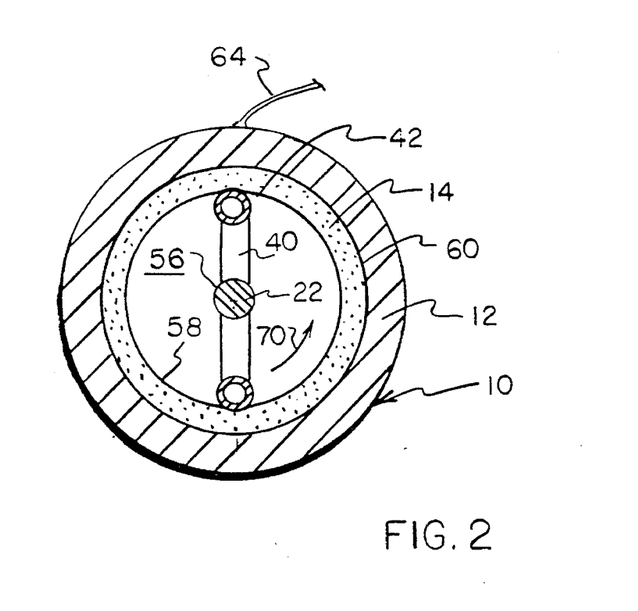
FIG. 2 is a cross-sectional view of the generator taken along line 2—2 of FIG. 1.

A piezoelectric electric generator 10 in accordance with the invention is illustrated in FIGS. 1 and 2. The generator 10 comprises a hollow, circular cylindrical member 12 of a rigid material, e.g., steel. A layer 14 of a flexible piezoelectric material is adhered to the inside surface 16 of the member 12 around the entire inner circumference thereof. The hollow member 12 includes two enclosing end walls 18 and 20 between which is mounted an axially extending shaft 22 of metal. The shaft 22 is mounted within metal bearings 24 in the end walls whereby the shaft 22 can be rotated about the member 12 central axis 26. One end 28 of the shaft 22 extends beyond the end wall 20 for engagement which a shaft rotating means.

For example, a rubber rim 30 can be mounted on the shaft end 28 for engagement with the side wall of the bicycle tire moving in the direction of the arrow 32 in FIG. 1. Means for mounting the generator on a bicycle for engagement of the shaft rim 30 with a tire of the bicycle can be substantially identical to the mounting means used for conventional bicycle generators, hence are not illustrated herein.

Also, the shaft end 28 can be secured, by suitable direct coupling means, in end to end relationship with the crankshaft of an internal combustion engine for rotating the shaft 22. Such direct driving of the shaft 22, i.e., without the use of pulleys and belts conventionally used with automobile engines, is feasible because of the possible small size and weight of the generator 10 as will become apparent hereinafter. In such engine use, the cylindrical member 12 is held fixedly in place by a suitable mounting bracket secured to the engine.

Figure 3:
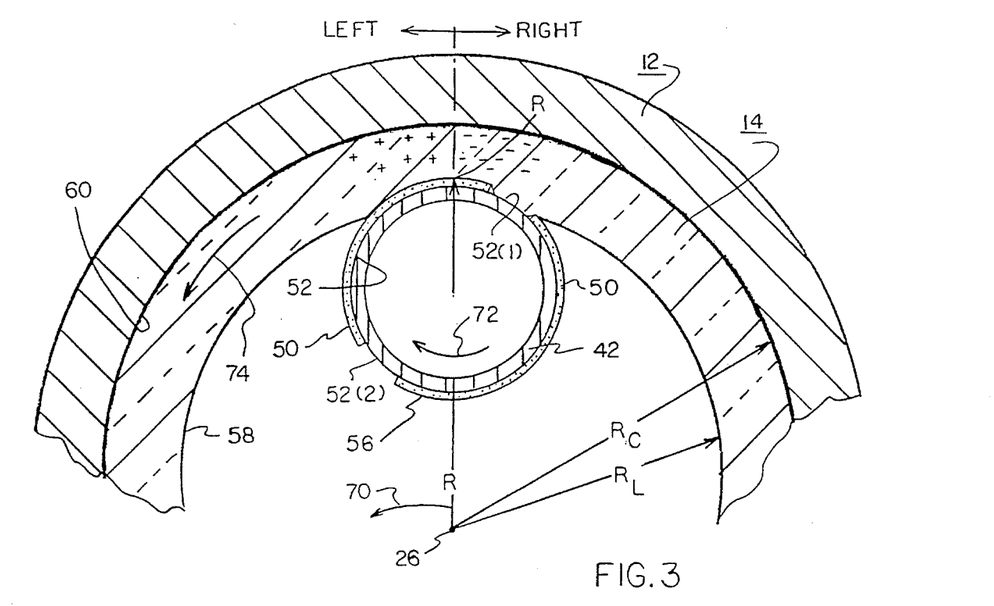
FIG. 3 is a view similar to FIG. 2 but showing only a portion of the generator shown in FIG. 2 on an enlarged scale.

A pair of metal arms 40 are rigidly mounted on the shaft 22 for rotation therewith. Each arm 40 extends radially outwardly in opposite directions from the shaft 22, and the two arms 40 are spaced apart along the length of the shaft within the member 12. Rotatably mounted between the arms at opposite ends of the arms are a pair of cylindrical, closed ended metal rollers 42, each roller 42 being rotatably mounted on a central axle 44 extending between the arms 40. As shown in FIG. 3, thin, elongated strips 50 of an electrically insulating material, e.g., a hard plastic material, are adhered to the surfaces 52 of the cylindrical rollers in spaced apart relationship. For a reason described hereinafter, the insulating strips 50 segment the rollers 42 into electrodes having circumferentially spaced apart electrically conductive surface portions.

The shaft 22, the arms 40 and the two cylindrical rollers 42 are collectively referred to as the armature 56. As shown in FIG. 3, the radius R of the armature 56, from the central axis 26 to the outer periphery of each roller 42, is slightly greater than the inner radius $R_1$ of the flexible piezoelectric material liner 14 and less than the inner radius $R_c$ of the outer, cylindrical member 12. Accordingly, where the rollers 42 contact the inside surface 58 of the liner 14, the liner is slightly compressed. Also, as the armature 56 rotates in response to rotation of the shaft 22, the two areas of compression (FIG. 2) of the liner 14 by the two rollers 42 rotate around the inner surface 58 of the liner 14.

A characteristic of piezoelectric materials is that they generate an alternating polarity electrical voltage across opposite surfaces thereof in response to being strained and destrained. In the present invention, such alternating straining and destraining occurs as successive portions of the liner 14 are first compressed as the rotating rollers 42 move into contact with the liner portions and then decompressed during passage of the rollers. By applying electrodes to opposite surfaces 58 and 60 of the liner 14 of piezoelectric material, electrical energy can be extracted from the liner. In the generator 10, one electrode comprises the outer, metal cylinder 12 against which the liner 14 is compressed by the rollers 42, and the other electrode comprises the armature 56. The shaft 22 is electrically connected, e.g., via the metal bearings 24 and a metal end plate 18, to an extending wire 62. Another wire 64 is connected to the metal cylindrical member 14, and, to prevent shorting of the two wires 62 and 64, an insulator, e.g., a layer 66 of plastic, is disposed between the end walls 18 and 20 and the cylindrical member 12.

The purpose of the insulating strips 50 on the roller surfaces 52 is now described.

FIG. 3 shows an area of the liner 14 contacted and compressed by a roller 42. The armature 56 is being rotated by some external means (e.g., as previously described) in the direction shown by the arrow 70 and the roller 42 is rotating in the direction of the arrow 72. Where the roller 42 contacts the inside surface 58 of the liner 14, the liner is squeezed and compressed between the roller 42 and the outer cylinder 12. The maximum compression of the liner 14 occurs at the point R of maximum radius of the armature 56 and, with the rotations illustrated, the point R moves counterclockwise around the liner 14 as shown by the arrow 74. While the entire portion of the liner 14 contacted by the roller 42 is under compression, it is clear from FIG. 3 that, to the left of the point R, that is, in the direction of advance of the roller 42, the compression of the liner material is increasing. Conversely, in the direction to the right of the point R, that is, in the trailing direction of the roller, the compression of the liner material is decreasing.

As previously explained, an electrical voltage is generated between opposite surfaces 58 and 60 of the liner 14 with the polarity of the voltage being dependent upon whether the piezoelectric material is being compressed or decompressed. Accordingly, to the left of point R in FIG. 3, where the liner is being compressed, a voltage of a first polarity (the polarities being indicated by positive (+) and negative (−) signs) is being generated. Conversely, to the right of the point R where the liner is decompressing, the voltage being generated is of a polarity opposite to that of the first polarity. If the entire surface 52 of the roller 42 contacting the inner surface 58 of the liner were to comprise a continuous electrode, the opposite polarity voltages would be connected in parallel between the two electrodes 42 and 12. Thus, the two generated voltages would short one another and no power would be extracted from the generator.

To avoid this problem, portions of the surface 52 of the rollers 42 are covered with the thin insulator strips 50, and only the surface portions 52(n) exposed through the strips 50 function as electrodes. In the angular orientation of the roller 42 shown in FIG. 3, a roller electrode portion 52(1) contacts the liner 14 only along a region to the fight of the point R, and only a single polarity first voltage is generated between the roller 42 and the cylinder 12 electrodes. To the left of the point R, the roller metal surface is insulated from the liner 14 by the insulator strip 50, hence the roller 42 is insulated form the voltage being generated in the liner portion to the left of the point R. Also, as shown in FIG. 3, only the single electrode portion 52(1) is in contact with the liner 14.

Figure 4:
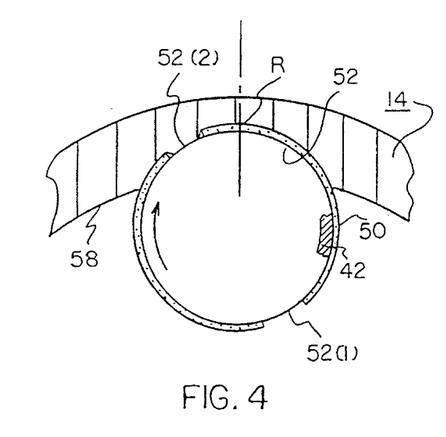
FIGS. 4 and 5 are similar to FIG. 3 but showing the roller shown in FIG. 3 at successively rotated positions.

Upon continued rotation of the roller 42, e.g., through about 135 degrees and to the angular position shown in FIG. 4, the roller electrode portion 52(1) moves out of contact with the liner 14 and a following electrode portion 52(2) contacts the liner 14 at an area to the left of the point R. To the right of the point R, the roller metal surface 52 is insulated from the liner by the strip 50.

Accordingly, the electrode portion 52(2) (and only this electrode portion) is now coupled to a second voltage of polarity opposite to that of the first voltage generated at the region to the fight of point R.

An alternating current voltage is thus produced by the generator.

Figure 5:
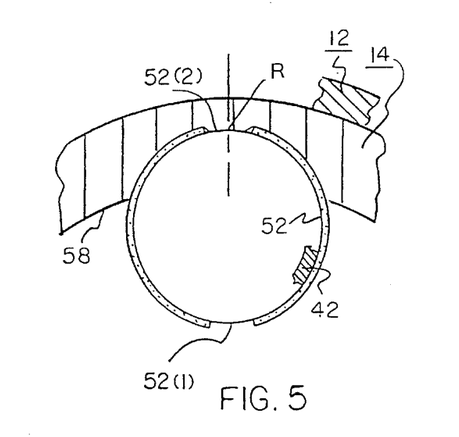

When the electrode portion 52(2) overlaps the point R, as shown in FIG. 5, opposite polarity voltages are connected between the two electrodes 12 and 42 of the generator. However, at the point R, the rate of change of liner compression is at a minimum, and the amplitudes of the voltages being generated immediately adjacent to point R, on either side thereof, are quite small. Accordingly, the electrical short provided by the electrode portion 52(2) when it overlaps the point R occurs when the generator output voltage is at its minimum amplitude and is in transition from one polarity to the other.

In any event, for minimizing any shorting effect by the electrode portions 52(1) and 52(2) while they overlap the point R, the angular width of the electrode portions is made as small as possible consistent with the power handling requirements of the electrode portions. However, because the electrode portions 52(n) are actually portions of an otherwise continuous surface 52 of a metal roller 42, it is obvious that the width of electrode portions can be extremely small, e.g., 5–10 degrees, without adverse effect on the power handling capacity of the roller electrode.

Each roller 42 is provided with two, 180 degree spaced apart electrode portions 52(1) and 52(2). As shown in FIG. 3, contact between the roller 42 and the liner surface 58 occurs along substantially less than 180 degrees of the roller surface, hence when one of the electrode portions 52(1) is first becoming separated from the liner surface 58, the oppositely disposed electrode portion 52(2) is still well spaced from the liner surface 58.

Should the parameters (e.g., stiffness of the liner material, thickness of the insulator strips, etc.) of the generator result in the liner contacting the roller along less than 120 degrees of its surface, then three, 120 degree spaced apart, electrode portions 52(n) can be used.

An advantage of the use of two rollers 42, on opposite sides of the armature 56, is that the efficiency of power conversion from the rotating armature is increased. In order to avoid voltage cancellation effects, the electrode portions on the two rollers should be in phase. This can be accomplished by known mechanical means, e.g., a timing chain extending between the two shafts 44 (FIG. 1) on which are mounted the two rollers.

Figure 6:
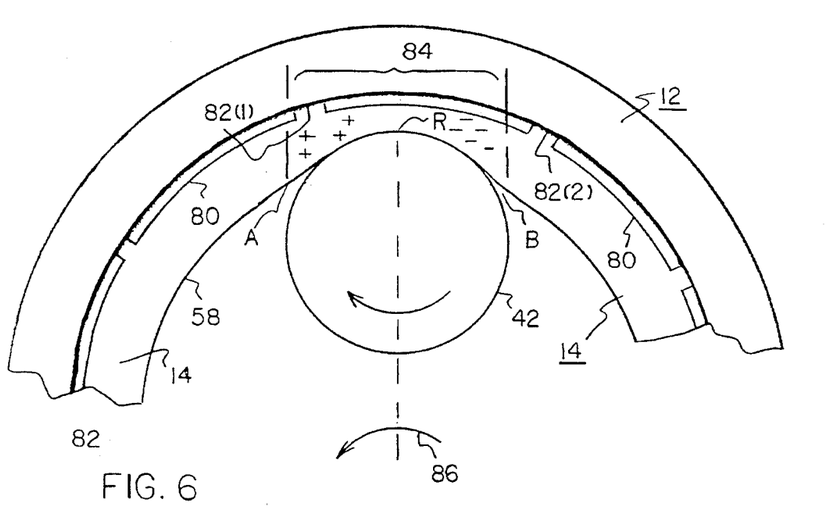
FIG. 6 is a view similar to FIG. 3 but showing a modification of the invention.

In another arrangement, shown in FIG. 6, the rollers 42 do not include insulator strips (such as the strips 50 shown in FIG. 3), and the entire surface of each roller 42 is a continuous electrode. Rather, thin insulator strips 80 are disposed on the inside surface 82 of the outer cylinder 12, and spaced apart cylinder electrode portions 82(n) are thus provided. The cylinder electrode portions 82(n) serve the same function as the roller electrode portions 52(n) (FIG. 3) for avoiding voltage cancellation effects and, to this end, the electrode portions 82(n) are spaced apart a distance determined by the size of the depression or cavity 84 formed in the liner 14 by the rollers 42.

As shown in FIG. 6, the surface 58 of the liner 14 within the depression 84 formed by the roller 42 does not conform exactly to the shape of the roller 42. A voltage is generated wherever deformation of the liner occurs and, in FIG. 6, the depression is shown to extend between points A and B, with the maximum depression depth being at point R. With the direction of rotation of the armature 56 shown by the arrow 86, the liner is being compressed between points A and R and decompressed between points R and B. Different polarity voltages are thus generated in the two regions A-R and R-B and, to avoid cancellation effects, the cylinder electrode portions 82(n) should be spaced apart a distance greater than A-B.

Such a spacing is shown in FIG. 6. Accordingly, at the time when the liner 14 opposite the electrode portion 82(1) is first becoming compressed and first starting to generate a voltage, the portion of the liner 14 opposite the immediately adjacent electrode portion 82(2) has already become fully decompressed and is no longer generating a voltage.

An advantage of the arrangement shown in FIG. 6, employing a segmented cylinder electrode 12, over the arrangement shown in FIG. 2, employing a segmented roller electrode 42, is that the phase relationship among the various cylinder electrode portions 82(n) is fixed and not subject to variation. Accordingly, there is no need for separate means, e.g., the aforementioned timing chain, for maintaining the desired voltage in-phase relationships when two or more rollers are used. Indeed, provided the rollers are spaced apart a distance at least equal to the width A-B (FIG. 6) of the liner depressions 84, any number of rollers 42 can be provided on the armature 56. In situations of high torque, low speed rotary motion, such a multiple roller arrangement is a preferred arrangement for maximizing the conversion efficiency of the generator.

Any number of different piezoelectric materials can be used, a principal requirement being an adequate lifetime in response to the repeated flexures thereof. At the present time, a preferred piezoelectric material is a known PVDF polymer or polymers. PVDF stands for polyvinylidene fluoride. By "PVDF polymers" is meant either the PVDF polymer by itself or various copolymers comprising PVDF and other polymers, e.g., a copolymer referred to as a P(VDF-TrFE) and comprising PVDF and PTrFE (polytrifluoroethylene). Other piezoelectric materials can be used.

The use of such PVDF polymer piezoelectric materials is known. Typically, the material is formed with plated electrodes on opposite surfaces thereof. The cost of the material is increased by the processes used to provide the plated electrodes, and the use of the material is complicated both by the need to protect and to make electrical connections to the electrodes. A significant advantage of the present invention is that the piezoelectric material liner 14 need not be plated or otherwise provided with integral electrodes. Rather, as described, the electrodes are provided by the separate outer cylinder 12 and the inner rollers 42 which make intimate contact with the liner 14 when the liner is being compressed between the two electrodes.

Another application or use of the invention is now described.

It has long been proposed to obtain energy from moving fluids, e.g., winds and bodies of water and also from surface waves on bodies of water. In the presence of streams of fluids, the heretofore described embodiments of the invention can be readily driven, for example, by a turbine rotated by the fluid streams. p Conversely, converting the energy of surface waves to electrical energy presents several problems owing to the type of motion presented by the waves. Also, while surface waves, e.g., ocean waves, can contain a significant amount of energy on a per wave basis, the waves typically have a quite low frequency, e.g., 0.1 Hz. Accordingly, power generating systems heretofore proposed tend to be rather large and somewhat complex for absorbing and converting the mechanical energy of surface waves to electrical energy. Such absorption and conversion is done quite simply and economically using the present invention.

Figures 7, 8:
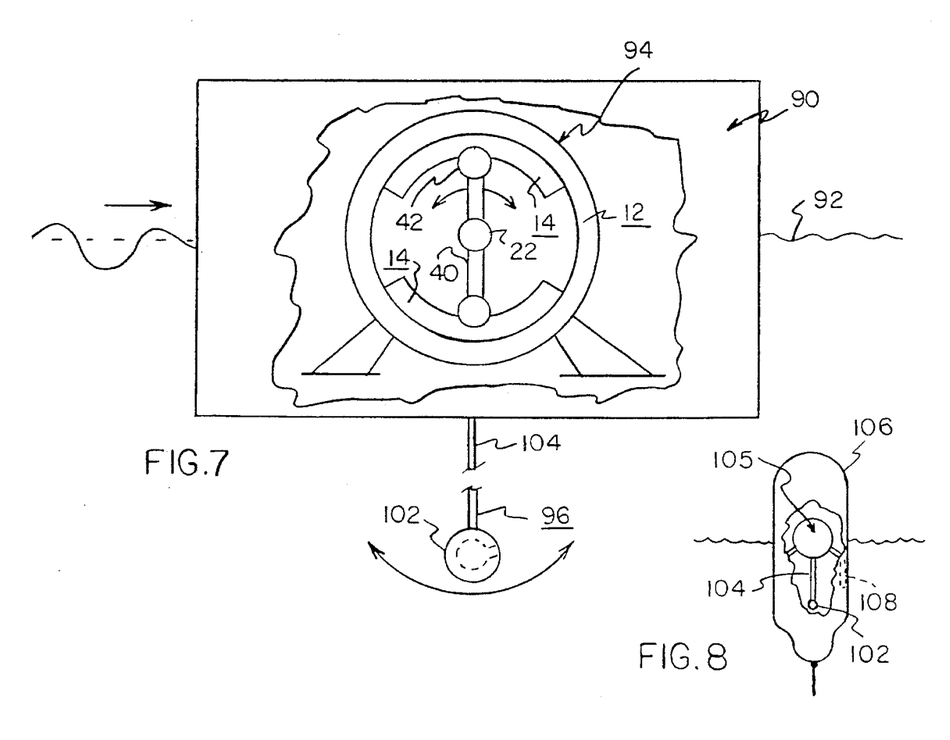
FIG. 7 is a side elevation, partly broken away, of another embodiment of the invention for converting mechanical energy of surface waves on a body of water to electrical energy.
FIG. 8 is similar to FIG. 7 but showing, on a reduced scale, a modification of the embodiment shown in FIG. 7.

In one embodiment, the rotatable shaft 22 shown in FIG. 1 is reciprocated by a pendulum which is suspended directly therefrom. This is shown in FIG. 7 which shows a float 90 on a body of water 92, a piezoelectric generator 94 (similar to the generator 10 shown in FIG. 1 ) within the float 90, and a generator shaft 22 extending outwardly through a side of the float 90. A pendulum 96 is secured to the shaft 22 and is suspended therefrom within the surrounding water. As the float 90 rocks on the water surface in response to passing waves, the pendulum 96 is driven into oscillation, thereby reciprocally rotating the shaft 22. Preferably, although not illustrated, means are provided for maintaining the float 90 oriented with the shaft 22 perpendicular to the axis of advance of the waves. Thus, as the float tilts in opposite directions in response to passing waves, the pendulum 96 is driven into oscillation in a plane parallel to the wave advance.

Considering the apparatus 10 shown in FIG. 2, it is apparent that if the shaft 22 is rotated in alternating directions, through less than 180° by an oscillating pendulum, the rollers 42 will be caused to rotate back and forth only along a portion of the total circumference of the cylinder 12. Accordingly, for use with a reciprocating driving force, e.g., the aforedescribed pendulum, the generator 94 shown in FIG. 7 need comprise only such portion of the circumference of the cylinder 14 actually engaged by the alternately rotated rollers.

As a practical matter, for reasons of structural strength, the outer cylinder 12 shown in FIG. 1 is still preferably used, as shown in FIG. 7, but the angular length of the liner 14 is reduced in accordance with the angular lengths of travel of the rollers 42.

Of significance, the polarity of the electrical voltage produced by the generators disclosed herein is a function only of whether the liner 14 is being compressed or decompressed. Accordingly, an a.c. voltage is generated regardless if the shafts 22 rotate continuously or reciprocally.

The amount of energy absorbed by a pendulum is a function of the mass of the bob 102 (FIG. 7) at the end of the pendulum and the length of the pendulum arm 104.

Preferably, for maximizing the efficiency of energy transfer from the waves to the pendulum, the pendulum is caused to oscillate in resonance with the passing waves. The frequency of oscillation of a pendulum can be made to be solely dependent upon the length of the pendulum arm 104. A particular advantage of this is that quite simple means, e.g., a telescoping arm, can be provided for automatically adjusting the arm length for matching the pendulum natural frequency with that of changes in frequency of the passing waves.

Additional tuning of the system, for matching its natural frequency to changing frequencies of the passing waves, involves changing the mass of the bob 102. This is accomplished with the use of a hollow bob, and pump and valve means for adjusting the amount of water contained within the bob.

In another embodiment, shown in FIG. 8, an entire pendulum system 105 is disposed within a float 106, e.g., a buoy requiring electrical energy for charging batteries for energizing navigation lights and horns mounted on the buoy. The identical features for tuning the pendulum system described in connection with FIG. 7 can be used in the FIG. 8 system. For changing the amount of water in the bob 102 in the FIG. 8 arrangement, the pendulum arm 104 is made hollow, and suitable pump and valve means 108 are provided for pumping water into and out of the bob 102 through the hollow arm 104.

Figure 9:
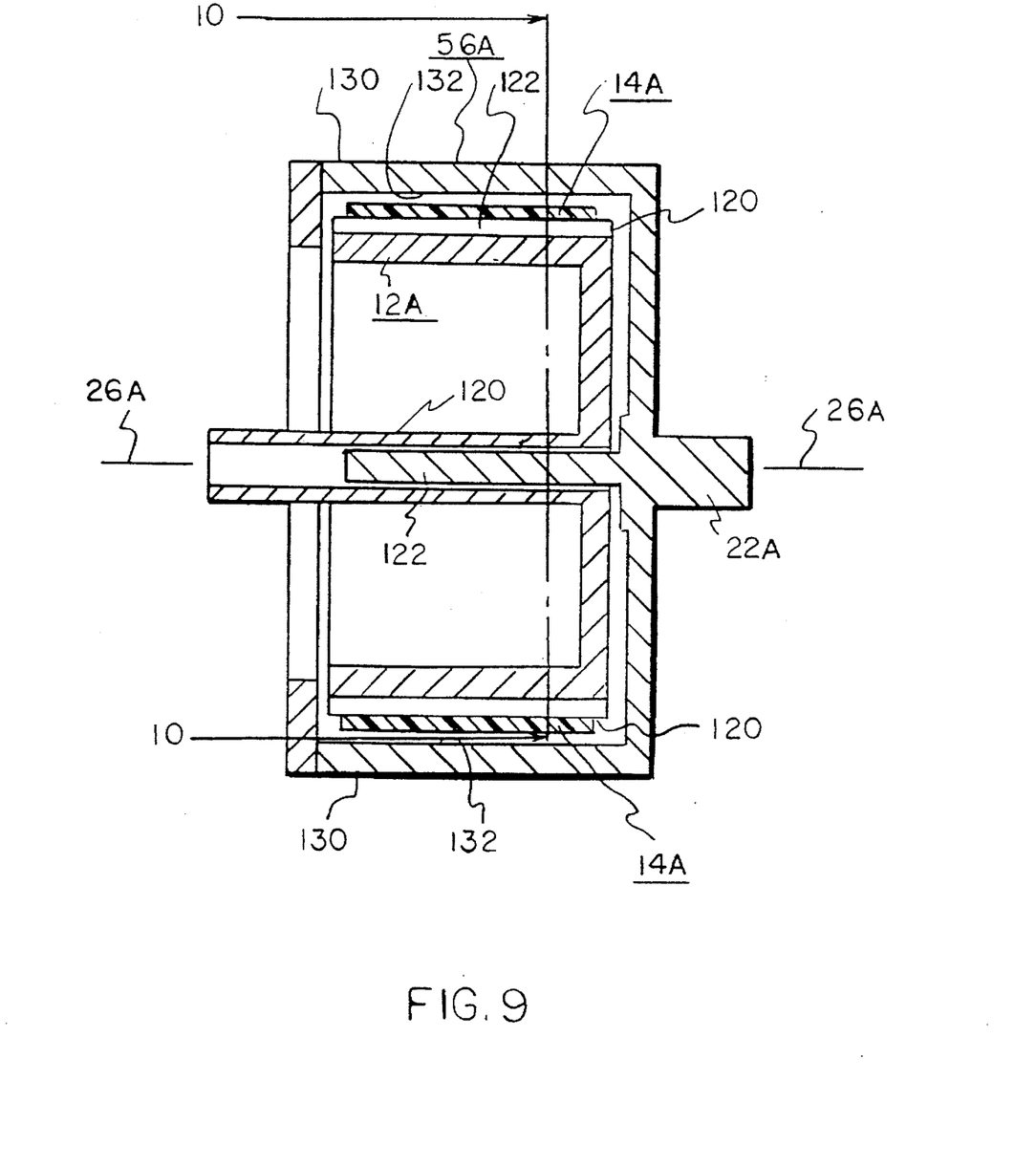
FIGS. 9 and 10 are similar to FIGS. 1 and 2, respectively, but show a further embodiment of the invention.
Figure 10:
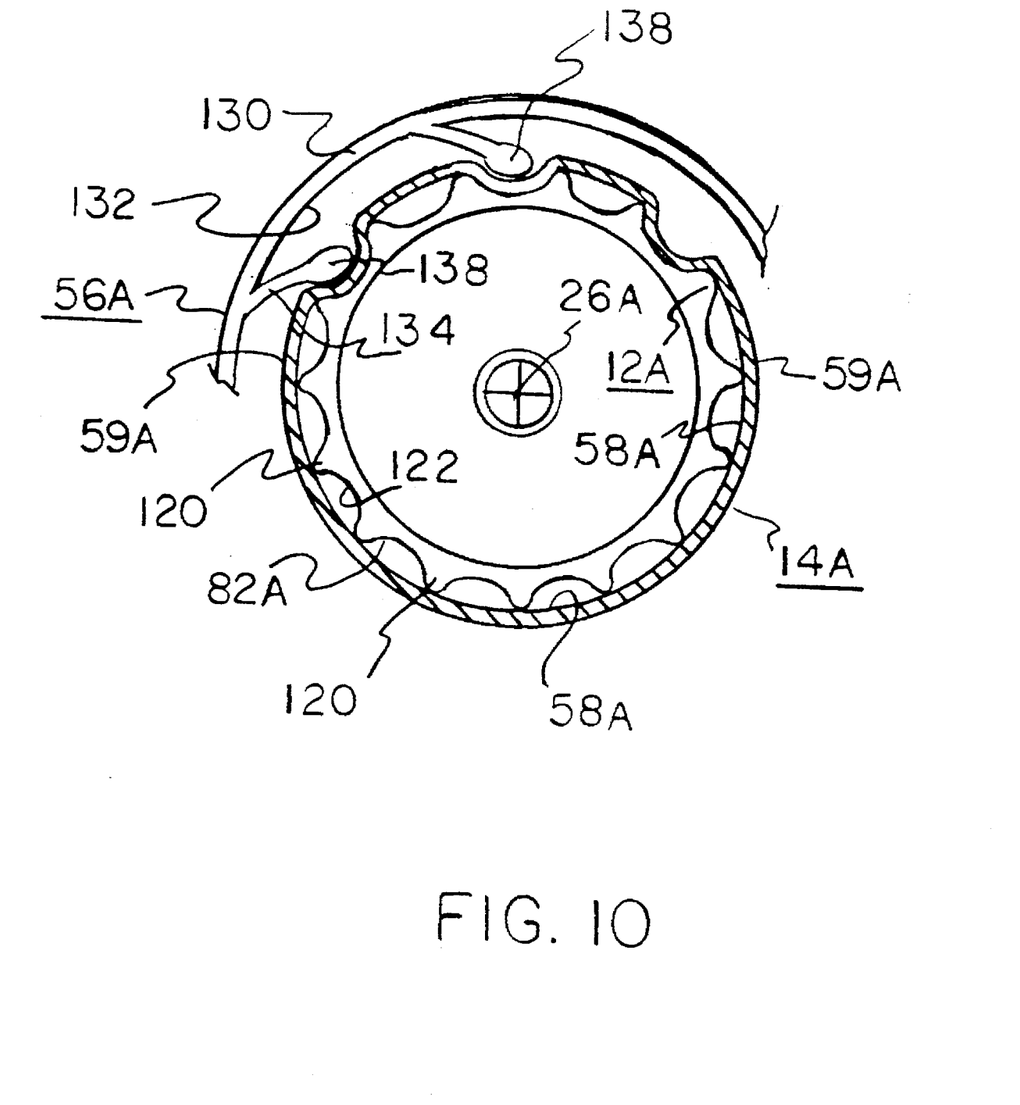

Another embodiment of the invention is schematically shown in FIGS. 9 and 10. This embodiment is similar to the ones previously disclosed in that it includes a piezoelectric material cylindrical liner 14A disposed between a stationary member 12A and a rotatable armature 56A. However, in this embodiment, the stationary member 12A is disposed within the cylindrical liner 14A and the armature 56A is mounted for rotation around the outside of the liner 14A.

Thus, as shown in FIG. 9, the stationary member 12A is mounted on a hollow shaft 120 adopted to be rigidly attached to an enclosing housing, not shown. The armature 56A is mounted on a shaft 22A which includes a bearing rod 122 rotatably received within the hollow shaft 120. Various attaching and bearing members for holding the assembly together are not shown. Means, such as previously described, can be used for rotating the shaft 22A for causing rotation of the armature 56A around the stationary liner 14A and the stationary member 12A.

A further difference from the prior disclosed embodiments is that the liner 14A is not variably strained primarily by variable compression, but rather by variable stretching. To this end, the piezoelectric material of the liner 14A, e.g., the afore-described PVDF polymer, is poled to be of the type ($d_{31}$) wherein variable electrical potential differences are generated between the major surfaces 58A and 59A of the liner 14A in response to variable stretching of the liner in directions parallel to the surfaces.

For achieving such variable stretching, the outer surface 82A of the stationary member 12A is shaped similarly as a sprocket wheel having a plurality of spaced apart teeth 120 forming axially extending ridges along the member. More specifically, the outer surface 82A of the member 12A comprises, in cross-section, a plurality of equally spaced apart raised portions 120 alternating with a plurality of depressed portions 122, all the portions 120 and 122 extending axially along the outer surface of the cylindrical member 12A.

The liner 14A is in the form of a cylinder having an inner diameter just slightly less than the maximum diameter of the toothed member 12A so that the liner fits relatively snugly in place on the member with the inside surface 58A of the liner tangentially contacting the radially outer ends of the raised portions 120. Preferably, the liner 14A is fixed in place relative to the member 12A so that relative rotation between the two does not occur. Also, the liner wall is in slight circumferential tension owing to the snug fit of the liner 14A around the member 12A.

The armature 56A comprises a rigid cylindrical wall 130 mounted for rotation about an axis 26A common to the stationary member 12A and the liner 14A. The inside surface 132 of the armature 56A is spaced radially from the outside surface 59A of the liner 14A but includes a plurality of leaf springs 134 secured to the inside surface 132 and forming an acute angle therewith. The leaf springs 134 can comprise, for example, elongated, thin plates of spring steel having one elongated edge secured to the member inside surface 132 and extending axially therealong.

The opposite, elongated edges of the springs extend generally tangentially towards the liner outer surface 59A and terminate in enlarged cam members 138. The cam members 138 have generally circular cross-sections. The springs 134 bias the cams 138 for movements radially inwardly of the stator member 12A and with such force that where a cam member 138 engages the liner at a position between two raised portions 120 and overlying a depressed portion 122, the spring biased cam member 138 forces the liner wall inwardly of the depression. The liner wall is thus stretched and, during such stretching, generates electricity.

Although not shown, the cams can be replaced with elongated rollers rotatably mounted on the ends of the leaf springs 134.

Electrodes for collecting the generated electrical energy can comprise the cam members 138 and the stator member 12A.

FIG. 10 indicates that a plurality of spaced apart spring biased cam members 138 can be used. Importantly, the cam members 138 are so positioned that their engagements with the liner 14A are always in phase, that is, they are spaced apart an integer number of times the spacings between the raised projections 120. Thus, as shown in FIG. 10, all the liner wall portions engaged by the various cam members 138 are being identically strained, i.e., stretched as illustrated.

Operation of the embodiment shown in FIGS. 8 and 9 is as follows. As the armature 56A is rotated around the liner 14A, the various spring biased cam members 138 move along the liner wall and force the liner wall into the stationary member depressions as the cam members rotate opposite thereto. While the liner wall portions are being inwardly deflected and stretched, electrical energy is generated. As the cam members continue to move around the liner, thereby allowing the liner wall portions to spring outwardly of the depressions, destretching and destraining of the liner wall portions occur owing to the elasticity of the liner. Stretching of the liner beyond its elastic limit is avoided and, for long life of the material, only a relatively small amount of stretching, e.g., 4%, occurs.

By way of more specific example, when the liner is initially mounted on the stator member 12A, a circumferential stretching of about 1% is provided. Thereafter, as the liner wall is forced inwardly between the raised portions 120, an additional 3% stretching occurs.

What is claimed is:

1. A piezoelectric generator comprising a first member, a second member of piezoelectric material disposed along said first member, an armature movable relative to second member for alternately straining and destraining adjacently disposed portions of said second member in response to said adjacently disposed portions of said second member being successively compressed and decompressed between said armature and said first member, said first member comprising a portion of a circular cylinder, said second member comprising a uniformly thick layer of said piezoelectric material disposed in contact with said first member, and said armature comprising a member rotatable about an axis of revolution of said first member, said first member and said armature comprising electrically conductive materials which are rigid in comparison with said piezoelectric material, and said first member and said armature each comprising an electrode for contact with a respective one of oppositely disposed surfaces of said piezoelectric material layer for collecting electrical energy in response to said alternating straining and destraining thereof.

2. A generator according to claim 1 wherein one of said electrodes is segmented into spaced apart electrode portions electrically insulated from one another along said one surface contacted by said one electrode.

3. A generator according to claim 2 wherein said armature includes a shaft rotatable about said axis, an arm mounted on said shaft and extending radially therefrom, and a roller mounted on said arm for rotation abut a roller axis parallel to said shaft axis, and said roller having a peripheral surface engaging said second member.

4. A generator according to claim 3 including means for rotating said shaft about said axis for providing said relative movement between said armature and said second member.

5. A generator according to claim 4 wherein said rotating means comprises a pendulum suspended from said shaft.

6. A generator according to claim 5 wherein, in use of said generator, said pendulum swings through an arc of less than 360 degrees, and said layer of piezoelectric material is disposed along a portion of a cylindrical surface of said first member having an angular length less than 360 degrees.

7. A generator according to claim 6 wherein said first member comprises a hollow, circular cylinder, and said cylindrical surface comprises an interior surface of said cylinder.

8. A piezoelectric generator comprising a first member, a second member of piezoelectric material disposed along said first member, an armature moveable relative to said second member for alternately straining and destraining adjacently disposed portions of said second member in response to said adjacently disposed portions of said second member being successively stretched and destretched between portions of said first member by contact of said armature with said adjacently disposed second member portions, said first member having a surface including a plurality of spaced apart raised portions alternating with a plurality of depressed portions, said second member being stretched in tension relative to said first member for contacting said raised portions and being spaced above said depressed portions, and said armature being spring biased for pressing successive portions of said second member extending between adjacent raised portions downwardly relative to said adjacent raised portions in response to movement of said armature relative to said second member, and electrodes connected to said second member for collecting electrical energy in response to said alternating straining and destraining thereof.

* * * * *